July 5, 1932. T. J. URBAN 1,866,432
AIRPLANE AND MOUNTING THEREFOR
Filed Aug. 6, 1930   2 Sheets-Sheet 1
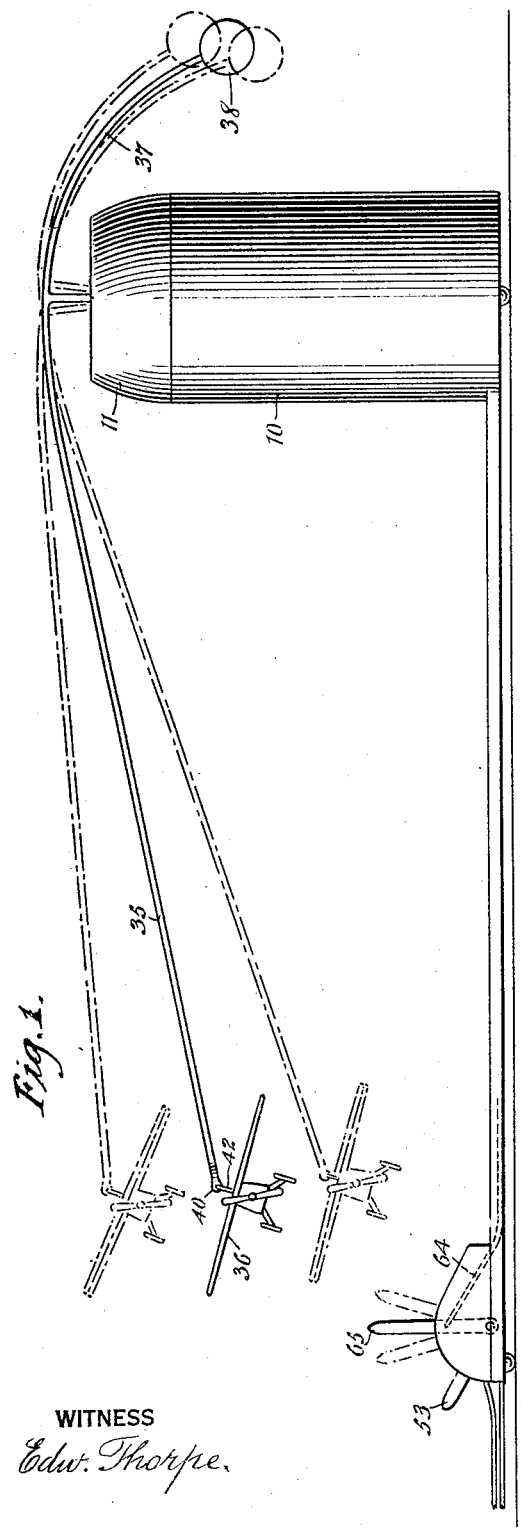
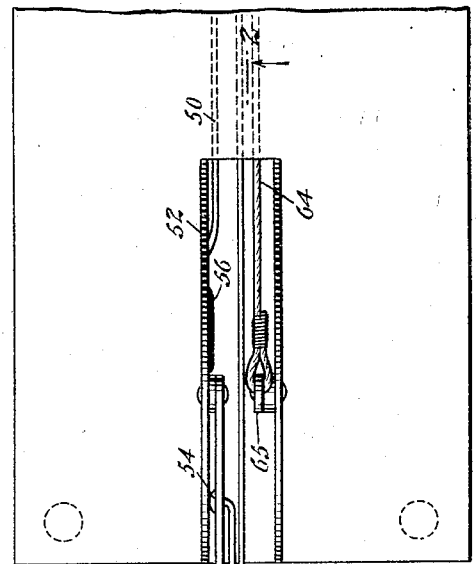
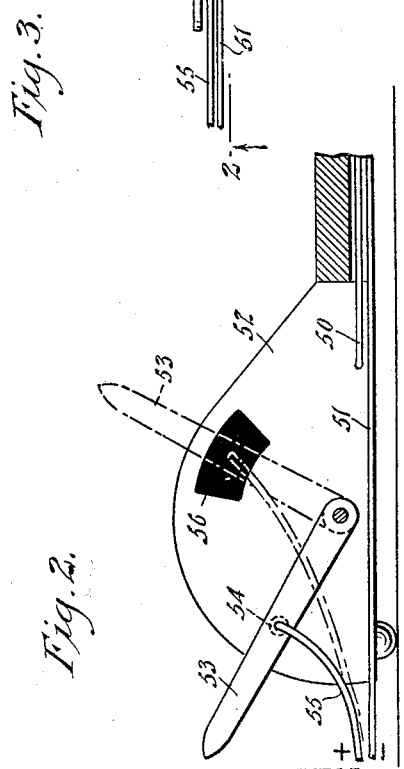
WITNESS
Edw. Thorpe.
INVENTOR
Thomas J. Urban
BY Munn & Co.
ATTORNEYS July 5, 1932.  T. J. URBAN  1,866,432
AIRPLANE AND MOUNTING THEREFOR
Filed Aug. 6, 1930  2 Sheets-Sheet 2
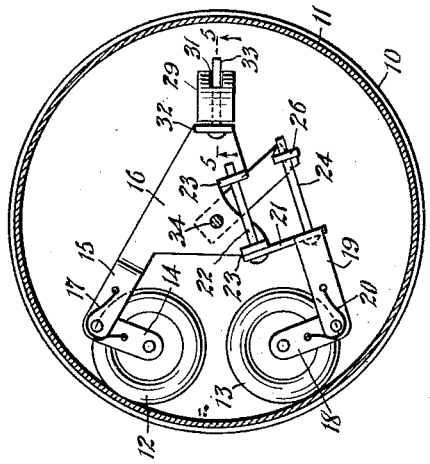
INVENTOR
Thomas J. Urban
BY
ATTORNEYS
WITNESS
Edw. Thorpe Patented July 5, 1932

1,866,432

UNITED STATES PATENT OFFICE

THOMAS J. URBAN, OF WEST PITTSTON, PENNSYLVANIA

AIRPLANE AND MOUNTING THEREFOR

Application filed August 6, 1930. Serial No. 473,395.

The invention relates to airplanes, and more particularly toy airplanes, and has for an object to provide means for controlling the movements of an airplane from without the airplane so that the airplane when used as a toy may be operatively controlled as may be desired.

The invention has for another object to provide a mounting for the airplane with means to regulate the actions of the mounting, which serves to control the movements of the airplane.

The invention has for another object to provide a pivoted arm to which the airplane is secured so that the airplane will circle on the arm around the pivot.

Still another object of the invention is to provide control means for rotating the arm and for moving the arm vertically to move the airplane in various directions.

The invention further comprehends an airplane which is secured to a mounting, there being means to move the mounting for flying the airplane in a horizontal direction, and means for controlling the movement of the first mentioned means to direct the airplane in a vertical direction.

The invention furthermore comprehends means to move on a vertical axis the arm supporting the airplane and for tilting the arm from the horizontal to raise the airplane.

The invention furthermore comprehends means to move the arm supporting the airplane on a horizontal axis so that the airplane will be directed upwardly or downwardly as desired.

Still another object of the invention is to provide means to rotate on its vertical axis the arm supporting the airplane to move the arm on a horizontal axis to direct the airplane upwardly or downwardly and to support the arm during its rotation in the adjusted position to which it has been moved.

Additional objects of the invention will appear in the following specification in which the preferred form of the invention is described.

In the drawings similar reference characters refer to similar parts in all the views, of which Figure 1 is a side elevation illustrating the invention, Figure 2 is a sectional view on the line 2—2, of Figure 3, Figure 3 is a plan view showing the means for controlling the movements of the airplane, Figure 4 is an enlarged elevational view in section illustrating the means for operating the airplane, Figure 5 is an enlarged sectional view illustrating the mounting for the frame which carries the standard and the arm supporting the airplane, Figure 6 is a sectional view on the line 6—6, of Figure 4, and Figure 7 is a view on the line 7—7 of Figure 4.

It will be understood that while my invention is referred to as a means for operating airplanes, and particularly toy airplanes, any suitable device may be secured on the extended arm and may be moved through the air to operate as an airplane, the invention residing in the means for the movement of this arm which carries the airplane or other similar device.

By referring to the drawings it will be seen that a casing 10 is provided and that in this casing there is a drum 11, which as illustrated in the drawings extends above the casing, this drum having sides which are curved vertically and which are engaged by rollers 12 and 13. The roller 12 is mounted for rotating on an arm 14 pivoted to an arm 15 of the frame 16, the spring 17 being provided for holding the arm 14 extended so that the roller 12 will at all times engage the inner sides of the drum 11. The roller 13 is also mounted to rotate on an arm 18 which is pivoted to a mounting 19, the arm 18 being also extended by a spring 20 so that the roller 13 will at all times engage with the inner sides of the drum 11. The mounting 19 is secured to an arm 21 which has a stud 22 pivoted in bearings in lugs 23 extending from the frame 16. The mounting 19 also has a stud 24 which extends through an aperture 25 in an operating arm 26, this operating arm having a bent portion with bearings 27 through which the shaft 28 is disposed.

Mounted for rotating with this shaft 28 there is a bearing member 29 which is bent and has a bearing 30 with a vertical slot 31 spaced from the said bearing 30. The frame 16 has a flange 32 and secured to this flange 32 and extending therefrom there is a pin 33, the pin 33 extending through the bearing 30 and being disposed in the slot 31. It will, therefore, be understood that with the rotation of the shaft 28 the bearing member 29 will serve to rotate the frame 16 which has a standard 34 carrying an arm 35 secured to the airplane or device 36. As the standard 34 is secured to the frame 16 the standard 34 will rotate the arm 35 extending from the standard 34 and the airplane or device 36. There is also an arm 37 extending rearwardly from the standard 34 and to this arm 37 there is secured a counterweight 38.

From the above description it will be understood that with the rotation of the shaft 28 the standard 34 will be rotated and by means of the arm 35 will serve to rotate the airplane 36. However, when the operating arm 26 is raised, as illustrated by the dotted lines of Figure 4, it will serve to move the mounting 19 upwardly, which will direct the roller 13 upwardly and will serve to tilt the frame 16 with the roller 12, as well as the roller 13 moving along the upper inner side of the drum 11. This tilting of the frame 16 will also serve to tilt the standard 34 as the standard 34 is rotated with the frame 16 to raise the airplane or similar device 36.

When the roller 13 is moved to travel upwardly on the inner walls of the drum 11, the frame 16 will also be tilted at the roller 13 to move upwardly relatively to the drum. Inasmuch as the arm 35 is secured to the frame 16 by the standard 34, the airplane secured to the arm 35 as well as the frame 16 will be tilted to move upwardly, pointing the airplane upwardly. It is understood that, as the roller 13 approaches the top of the drum, the operating arm 26 may be lowered by the means hereinafter described to prevent the roller 13 from passing out of the top of the drum.

It will also be understood that during this movement not only will the arm 35 serve to raise the airplane, but the arm 35 will be moved on its axis with the frame 16 which is pivoted at its pin 33, as has been explained, so that the airplane will be pointed upwardly as it moves upwardly to a higher level. When the airplane reaches the desired level it may be kept in this position by a reduced upward pressure of the operating arm 26 and when it is desired to permit the airplane to turn downwardly to a lower level all upward pressure on the operating arm 26 is removed so that the spring 39 will serve to move the operating arm 26 downwardly and will incline the mounting 19 to direct the roller 13 downwardly, which will serve to tilt the standard 34 to direct the airplane or other similar device downwardly. When the airplane has travelled downwardly to the desired level, the operating arm 26 is partially raised so as to straighten out or level the roller 13. It will thus be seen that the airplane may be brought to any desired level by moving the operating arm 26 up or down and may be retained at a desired elevation by simply leveling off the roller 13 and maintaining it in this position.

By referring to Figure 8 it will be seen that the arm 35 is forked and has two portions 40 which have bearings 41 in which a rod 42 on the airplane or similar device is disposed. Therefore, when the arm 35 is rotated on its axis at the frame 16 its control of the airplane 36 will be such as to give a definite upward or downward direction to the airplane or similar device.

In the bottom of the casing 10 there is an electric motor in a casing 43, the electric motor having a shaft 44 on which there is a gear 45 meshing with a gear 46 on a shaft 47, there being also a worm 48 on the shaft 47 which meshes with a worm wheel 49 on the shaft 28. The wires 50 and 51 from this electric motor extend away from the casing 10 and the wire 50 has electrical contact with a plate 52, the wire 51 extending to a battery. Pivoted to this plate 52 there is a lever 53 which has a contact member 54 insulated from the lever 53, but electrically connected with a wire 55 which leads to the battery. The plate 52 also has an insulating plate 56. It will, therefore, be understood that when the lever 52 is in the position shown by the full lines in Figure 2 of the drawings, the motor will be driven, but when the lever is moved to the postion illustrated by the dotted lines in the said figure the circuit will be broken to stop the motor.

The drum 11 is supported in the casing 10 by supports 57 and connecting these supports 57 there is a tie member 58, there being an aperture 59 in this tie member 58 in which is disposed a hook 60 on an arm 61 of a lever 62. This arm 61 is disposed under the lower bent portion 27 of the operating arm 26, the other arm 63 of this lever 62 being connected by a cord 64 with a control stick or lever 65. Therefore, it will be understood that when the control stick lever 65 is moved rearwardly it will serve to move the lever 62 to the position indicated by the dotted lines in Figure 4 of the drawings to raise the operating arm 26 to control the flight of the airplane or similar device by the means which have been described. The cord 64 is preferably of sufficient length that when the lever 65 is in upright or neutral position, the roller 13 will be directed in the level or straight ahead direction. Thus, it will be seen that by moving the lever 65 forward or backward from neutral, the roller 13 may be directed down or up so as to lower or elevate the plane to a desired level. As soon as the plane has reached the desired level it may be maintained thereat by moving the lever 65 back to neutral again in much the same manner as the "stick" in a real airplane.

With the lever 53 disposed in the position indicated by the dotted lines in Figure 2 of the drawings, and with the motor stopped the said lever may be moved rearwardly, but still in contact with the insulating plate 56, with the motor and the gearing serving as a brake, but with the lever 53 in position to be moved quickly to start the motor, and as the motor and gear act as a brake, to release this braking effect. With the operation of the motor the airplane will then taxi on the ground until by means of the control stick or lever 65 the standard 34 is tilted by the means which have been described to direct the airplane or similar device upwardly, when the airplane or similar device will then be in flight. The altitude of the airplane or similar device may be controlled by the control stick or lever 65 and when it is desired to effect a landing the airplane or similar device may be directed downwardly by means of the control stick or lever 65 in connection with the means described, and when the airplane or similar device has landed it may taxi for a distance as desired under the control of the lever 53, which makes or breaks the circuit connected with the motor.

It will be understood that to interest the persons using the device marks may be made on the plate 52 to indicate the relative positions of the motor in the usual airplane practice, as for instance, the marks may indicate that the motor is stopped with the brake on, the brake, as has been described, being the motor when not in operation together with the gearing, a second position being also with the motor off and with the motor and gearing serving as a brake, these positions being indicated adjacent the insulating plate 56. Another landing position may be indicated at the rear of the insulating plate 56 with the motor on and, of course, with the brake off. Another position may be taxiing with the motor on and the brake off, and still another position, which is the flying position, with the motor on and the brake off. However, as has been explained, in all cases the motor will be operated when the lever 53 is disposed away from the insulating plate 56, while the circuit to the motor will be broken when the lever is in the position indicated by the dotted lines in Figure 4 of the drawings.

What is claimed is:

1. An airplane having a propeller, means operating independently of the propeller for propelling the airplane, for directing the airplane vertically and keeping the airplane at a vertical level to which it has been moved, and means spaced from the airplane for controlling the first mentioned means while the airplane is in flight.

2. An airplane having a propeller, an arm to which the airplane is secured, and means operating independently of the propeller to move the arm on vertical and horizontal axes while the airplane is in flight.

3. An airplane having a propeller, an arm to which the airplane is secured, and means operating independently of the propeller to move the arm on vertical and horizontal axes and for holding the arm in adjusted position on its horizontal axis.

4. An airplane, an arm to which the airplane is secured, a standard to which the arm is secured, and means spaced from the airplane to rotate and tilt the standard.

5. A drum having curved sides, a frame having a roller engaging the sides of the drum, an airplane, means connecting the frame with the airplane for operating the latter, means for rotating the frame, and means for directing the path of movement of the roller relatively to the sides of the drum.

6. A drum having curved sides, a frame having a bearing and a roller engaging the sides of the drum, a second roller engaging the sides of the drum and having a mounting journaled in the bearing, an airplane, means connecting the frame with the airplane for operating the latter, means for rotating the frame, and means for moving the mounting relatively to the frame.

7. A drum having vertically curved sides, a frame disposed within the drum and provided with a bearing and a roller engaging the sides of the drum, a second roller engaging the sides of the drum and having a mounting journaled in the bearing, an airplane, means connecting the frame with the airplane for operating the latter, means for rotating the frame, and means for moving the mounting relatively to the frame.

8. In an airplane mounting, a shaft, means to rotate the shaft, a bearing member rotatable by the shaft, a frame mounted for movement on the bearing member, an airplane, means connecting the frame with the airplane for operating the latter, and means to move the frame relatively to the bearing member.

9. In an airplane mounting, a drum having curved sides, a frame disposed in the drum and having a bearing and a roller engaging the sides of the drum, a second roller engaging the sides of the drum and having a mounting journaled in the bearing, an airplane, means connecting the frame with the airplane for operating the latter, a shaft, means to rotate the shaft, a bearing member mounted for rotating with the shaft, the frame being mounted for movement on the bearing member, and means for moving the mounting relatively to the frame.

10. In an airplane mounting, a drum having curved sides, a frame disposed in the drum and having a bearing and a roller engaging the sides of the drum, a second roller engaging the sides of the drum and having a mounting journaled in the bearing, an airplane, means connecting the frame with the airplane for operating the latter, a shaft, means to rotate the shaft, a bearing member mounted for rotating with the shaft, the frame being mounted for movement on the bearing member, means for moving the mounting relatively to the frame, and means spaced beyond the path of movement of the airplane for controlling the second and third mentioned means.

11. In an airplane mounting, a drum having vertically curved sides, a frame having a bearing, a roller engaging the sides of the drum and having a mounting journaled in the bearing, an airplane, means connecting the frame with the airplane for operating the latter, means for rotating the frame, and means for moving the mounting relatively to the frame.

12. In an airplane mounting, a drum having vertically curved sides, a frame disposed in the drum and having a bearing, a roller engaging the sides of the drum and having a mounting journaled in the bearing, an airplane, means connecting the frame with the airplane for directing the latter, a shaft, means to rotate the shaft, a bearing member mounted for rotating with the shaft, the frame being mounted for movement on the bearing member, and means for moving the mounting relatively to the frame.

13. In an airplane mounting, a drum having curved sides, a frame disposed in the drum and having a bearing, a roller engaging the sides of the drum and having a mounting movable in the bearing, an airplane, means connecting the frame with the airplane for directing the latter, a shaft, a bearing member mounted for rotating with the shaft, the frame being mounted on the bearing member and having movement relatively thereto, and means slidably mounted on the shaft for moving the mounting relatively to the frame.

14. An airplane, means spaced from the airplane for propelling the airplane and for pointing the airplane upwardly.

15. An airplane, means spaced from the airplane for propelling the airplane and for moving the airplane on a transverse horizontal axis.

16. In a device of the class described, an arm, an airplane pivoted to the arm, and means spaced from the airplane to rotate the arm on a transverse axis and to rock the arm on a longitudinal axis.

17. In a device of the class described, an arm, an airplane mounted on the arm, and means spaced from the airplane to rotate the arm on a transverse axis and to rock the arm on a longitudinal axis during the flight of the airplane.

18. In a device of the class described, an arm, an airplane mounted on the arm, means spaced from the airplane to rotate the arm on a transverse axis, and manual means for rocking the arm on a longitudinal axis during the flight of the airplane.

19. A drum having sides, a frame, a roller movably mounted on the frame and engaging the sides of the drum, an airplane, means connecting the frame with the airplane for operating the latter, means for rotating the frame, and means for moving the roller relatively to the frame for directing its path of movement at the sides of the drum.

20. A drum, a frame having a roller engaging the sides of the drum, an airplane, means connecting the frame with the airplane for operating the latter, means for rotating the frame, and means for directing the path of movement of the roller relatively to the sides of the drum during the rotation of the frame.

21. An airplane having an extending arm, means spaced from the airplane and connected with the extending arm for rotating the arm, for directing the arm at the airplane vertically and for keeping the airplane at a vertical level to which it has been moved and during the rotation of the arm and the flight of the airplane.

22. A member having a curved surface, a frame having a roller engaging the curved surface of the member, an airplane, means connecting the frame with the airplane for operating the latter, means for rotating the frame, and means for directing the path of movement of the roller relatively to the curved surface of the member.

23. A member having a curved surface, a frame having a bearing and a roller engaging the curved surface of the member, a second roller engaging the curved surface of the member and having a mounting journaled in the bearing, an airplane, means connecting the frame with the airplane for operating the latter, means for rotating the frame, and means for moving the mounting relatively to the frame.

24. In an airplane mounting, a member having a vertically curved face, a frame having a bearing, a roller engaging the curved face of the member and having a mounting journaled in the bearing, an airplane, means connecting the frame with the airplane for operating the latter, means for rotating the frame, and means for moving the mounting relatively to the frame.

25. A member having a face, a frame, a roller movably mounted on the frame engaging the face of the member, an airplane, means connecting the frame with the airplane for operating the latter, means for rotating the frame, and means for connecting the roller relatively to the frame for directing its path of movement at the said face of the member.

26. A member having a face, a frame having a roller engaging the face of the member, an airplane, means connecting the frame with the airplane for operating the latter, means for rotating the frame, and means for directing the path of the movement of the roller relatively to the frame during the rotation of the frame.

THOMAS J. URBAN.